US012677052B2

(12) United States Patent
Wu et al.

(10) Patent No.: US 12,677,052 B2
(45) Date of Patent: Jul. 7, 2026

(54) IMAGE ACQUISITION ASSEMBLY

(71) Applicant: BOE TECHNOLOGY GROUP CO., LTD., Beijing (CN)

(72) Inventors: Yunpeng Wu, Beijing (CN); Lei Cao, Beijing (CN); Junmin Sun, Beijing (CN); Zifeng Wang, Beijing (CN); Yan Ren, Beijing (CN); Wenbin Wang, Beijing (CN); Yongjie Xiang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 177 days.

(21) Appl. No.: 18/681,567

(22) PCT Filed: Aug. 22, 2022

(86) PCT No.: PCT/CN2022/113810
§ 371 (c)(1),
(2) Date: Feb. 6, 2024

(87) PCT Pub. No.: WO2023/025071
PCT Pub. Date: Mar. 2, 2023

(65) Prior Publication Data
US 2025/0133283 A1 Apr. 24, 2025

(30) Foreign Application Priority Data
Aug. 27, 2021 (CN) .......................... 202110994746.9

(51) Int. Cl.
*H04N 23/54* (2023.01)
*H04N 23/51* (2023.01)

(52) U.S. Cl.
CPC ............. *H04N 23/54* (2023.01); *H04N 23/51* (2023.01)

(58) Field of Classification Search
CPC ..... A61P 35/00; C12Q 1/6869; C12Q 1/6886; C12Q 2600/112; C12Q 2600/154;
(Continued)

(56) References Cited

U.S. PATENT DOCUMENTS

2005/0122416 A1* 6/2005 Ryu ........................ H04N 23/66
348/E5.026
2007/0262217 A1 11/2007 Wang et al.
(Continued)

FOREIGN PATENT DOCUMENTS

CN 101564323 A 10/2009
CN 201875398 U 6/2011
(Continued)

OTHER PUBLICATIONS

China Patent Office, First Office Action dated May 24, 2025, for corresponding CN application No. 202110994746.9.

*Primary Examiner* — Amy R Hsu
(74) *Attorney, Agent, or Firm* — HOUTTEMAN LAW LLC

(57) ABSTRACT

Provided in the present disclosure is an image acquisition assembly, which belongs to the technical field of image acquisition, and can at least partially solve the problems in the existing art. The image acquisition assembly of the present disclosure includes: an attachment unit configured to be attached onto a display surface of a display screen; and an image acquisition unit connected to the attachment unit and configured to acquire an image on the display surface at a position where the attachment unit is located.

20 Claims, 6 Drawing Sheets

(58) Field of Classification Search
CPC ........ C12Q 2600/156; C12Q 2600/166; G01N
2500/10; G01N 2800/50; G01N 2800/52;
G01N 33/57434; H04N 23/50; H04N
23/51; H04N 23/54; H04N 23/55
See application file for complete search history.

(56) References Cited

U.S. PATENT DOCUMENTS

| | | | |
|---|---|---|---|
| 2012/0162437 A1* | 6/2012 | Azuchi ................. | H04N 23/57 |
| | | | 348/E7.085 |
| 2013/0187854 A1* | 7/2013 | Lee .................... | G06V 30/1423 |
| | | | 345/158 |
| 2021/0267079 A1* | 8/2021 | Cho .................... | H04M 1/0266 |

FOREIGN PATENT DOCUMENTS

| | | | |
|---|---|---|---|
| CN | 202306395 U | 7/2012 |
| CN | 103824544 A | 5/2014 |
| CN | 104091557 A | 10/2014 |
| CN | 205000782 U | 1/2016 |
| CN | 207910869 U | 9/2018 |
| CN | 208492053 U | 2/2019 |
| CN | 208858754 U | 5/2019 |
| CN | 208901019 U | 5/2019 |
| CN | 209299379 U | 8/2019 |
| CN | 211543422 U | 9/2020 |
| CN | 213236886 U | 5/2021 |
| CN | 213236889 U | 5/2021 |
| CN | 213541828 U | 6/2021 |
| CN | 215990975 U | 3/2022 |
| JP | 2020155146 A | 9/2020 |

* cited by examiner

IMAGE ACQUISITION ASSEMBLY

TECHNICAL FIELD

The present disclosure belongs to the technical field of image acquisition, and specifically relates to an image acquisition assembly.

BACKGROUND

Conventionally, to obtain an image displayed on a display screen, a camera may be disposed at a position far away from the display screen in advance, and after the display image is obtained, the desired local/global image can be obtained through later image processing, such as image cutting and pasting.

To obtain a local image, a camera may be disposed at a position far away from the display screen in advance, aligned to the area desired to acquire on the display screen, and focused to capture the image. However, this method requires the camera to be arranged according to the position of the display screen in advance. If the display screen is rotated, displaced or the like, the camera will become incorrectly positioned or focused, and thus need to be adjusted accordingly, involving complicated operations. In addition, due to the long distance between the camera and the display screen, people, objects and the like may enter the area between the camera and the display screen and block the shooting path.

SUMMARY

To at least partially solve the problems in the existing art, the present disclosure provides an image acquisition assembly.

In a first aspect, an embodiment of the present disclosure provides an image acquisition assembly, including:

an attachment unit configured to be attached onto a display surface of a display screen; and an image acquisition unit connected to the attachment unit, and the image acquisition unit is configured to acquire an image on the display surface at a position where the attachment unit is located.

In some embodiments, the attachment unit includes:

a housing having a cavity inside and an attachment port in communication with the cavity; wherein when the housing is placed on the display surface with the attachment port facing the display surface, the display surface closes the attachment port in a hermetic seal manner; and a moving structure in the cavity, wherein the moving structure is movable between a first position and a second position, and an outer side surface of the moving structure maintains the hermetic seal with an inner side of the housing during movement of the moving structure; and the second position is a position in the cavity farther away from the attachment port than the first position.

In some embodiments, the image acquisition unit is disposed in the cavity and configured to acquire the image of the display surface through the attachment port.

In some embodiments, the image acquisition unit is fixedly connected to the moving structure.

In some embodiments, the image acquisition unit includes a drive circuit board and a lens projecting from one side of the drive circuit board;

the moving structure includes a first moving member and a second moving member mutually connected, wherein the first moving member has an opening and is located on a side of the second moving member close to the attachment port; and the drive circuit board is sandwiched between the first moving member and the second moving member, and the lens passes through the opening in the first moving member.

In some embodiments, a first sealing member is provided between an outer side surface of the lens and an inner side surface of the opening in the first moving member.

In some embodiments, the image acquisition unit is fixedly disposed on a side of the second position away from the attachment port; and the moving structure is made of a transparent material.

In some embodiments, the housing is made of an opaque material.

In some embodiments, a second sealing member is disposed on an edge of the housing corresponding to the attachment port.

In some embodiments, a third sealing member is disposed between the outer side surface of the moving structure and the inner side surface of the housing.

In some embodiments, the image acquisition assembly further includes:

a locking structure configured to at least lock the moving structure when the moving structure is in the second position.

In some embodiments, the housing further has an operation port in communication with the cavity, and the operation port and the attachment port are positioned at two opposite ends of the cavity; and the attachment unit further includes an operation structure connected to a side of the moving structure facing away from the attachment port, and the operation structure extends out of the housing from the operation port.

In some embodiments, a locking structure is connected to the operation structure at a position outside the housing, and the locking structure is configured to at least contact the housing to lock the moving structure when the moving structure is in the second position.

In some embodiments, the housing includes a rear wall opposite to the attachment port, in which the operation port is provided; and the locking structure includes a locking member and an elastic member; wherein the elastic member is disposed between a rear wall and the moving structure, and when the moving structure is in the second position, the elastic member applies a pressure toward the attachment port to the moving structure; and the locking member is configured to at least contact one side of the rear wall facing away from the attachment port to lock the moving structure when the moving structure is in the second position.

In some embodiments, the elastic member is a spring sleeved outside the operation structure.

In some embodiments, the locking member is rotationally connected to the operation structure through a rotation shaft;

the locking member has a first contact surface and a second contact surface, a distance between the second contact surface and the rotation shaft is greater than a distance between the first contact surface and the rotation shaft, and a difference of the distance between the second contact surface and the rotation shaft and the distance between the first contact surface and the rotation shaft, is equal to a distance between the first position and the second position; and when the locking member is rotated such that the first contact surface contacts a side of the rear wall facing away from the attachment port, the locking member is configured to lock the moving structure in the first position; and when the locking member is rotated such that the second contact surface contacts the side of the rear wall facing away from the attachment port, the locking member is configured to lock the moving structure in the second position.

In some embodiments, the attachment unit includes:

a suction disk attached to the display surface.

In some embodiments, the image acquisition assembly further includes:

an engagement unit configured to be engaged with the display screen; wherein the attachment unit is connected to the engagement unit.

In some embodiments, the engagement unit includes:

a clamp includes a first branch and a second branch spaced apart from each other, and a connection part connecting the first branch and the second branch, wherein the first branch and the second branch are configured to clamp the display screen therebetween, and the first branch is located on a display surface side of the display screen; and the attachment unit is connected to the first branch.

In some embodiments, the engagement unit further includes a compression screw and a gasket;

the second branch is provided with a screw hole matched with the compression screw; and the compression screw passes through the screw hole, and the compression screw is connected to the gasket at an end close to the first branch.

In some embodiments, the image acquisition assembly further includes:

a bracket unit on which the display screen is disposed; wherein the engagement unit is connected to the bracket unit.

In a second aspect, an embodiment of the present disclosure provides an image acquisition assembly, including:

an engagement unit configured to be engaged with a display screen; and an image acquisition unit connected to the engagement unit; wherein when the engagement unit is engaged with the display screen, the image acquisition unit is located at a position away from a display surface of the display screen by a preset distance, and the image acquisition unit is configured to acquire an image of the display surface at a position where the image acquisition unit is located.

In some embodiments, the engagement unit includes:

a clamp includes a first branch and a second branch spaced apart from each other, and a connection part connecting the first branch and the second branch, wherein the first branch and the second branch are configured to clamp the display screen therebetween, and the first branch is located on a display surface side of the display screen; wherein the image acquisition unit is connected to the first branch.

In some embodiments, the image acquisition assembly further includes:

a bracket unit on which the display screen is disposed; wherein the engagement unit is connected to the bracket unit.

Figure 1:
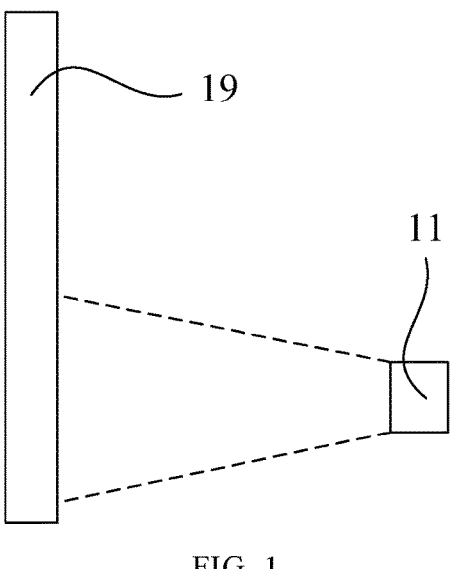
FIG. 1 is a schematic diagram illustrating a method for capturing a display image on a display screen in some existing art.

Reference Signs: 11. image acquisition unit; 111. drive circuit board; 112. lens; 113. lead; 19. display screen; 2. housing; 21. cavity; 211. attachment port; 212. operation port; 22. rear wall; 3. moving structure; 31. first moving member; 311. opening; 32. second moving member; 391. alignment protrusion; 392. alignment notch; 4. operation structure; 51. locking member; 511. first contact surface; 512. second contact surface; 519. rotation shaft; 52. elastic member; 6. engagement unit; 61. clamp; 611. first branch; 612. second branch; 6121. screw hole; 613. connection part; 62. compression screw; 631. gasket; 632. clamping member; 71. first sealing member; 72. second sealing member; 73. third sealing member; and 8. bracket unit.

DETAIL DESCRIPTION OF EMBODIMENTS

To improve understanding of the technical solution of the present disclosure for those skilled in the art, the present disclosure will be described in detail with reference to accompanying drawings and specific implementations.

It will be appreciated that the specific embodiments and drawings described herein are used merely for the purpose of explaining the present disclosure instead of limiting the present disclosure.

It will be appreciated that embodiments of the present disclosure and features thereof may be combined with each other as long as they are not contradictory.

It will be appreciated that, for convenience of description, only parts related to embodiments of the present disclosure are shown in the drawings, and parts not related to embodiments of the present disclosure are not shown in the drawings.

In some existing art, a camera is used to acquire an image displayed at a local area of a display screen.

For example, in the scoring process of an electronic test paper, the electronic test paper is displayed on a display screen for a scorer to score, while an image of a name on the test paper is acquired by a camera to determine a person corresponding to the test paper through image analysis, thereby matching the person with the score.

For another example, for display screens in public places, such as those on subways, on buses, advertisement display screens, and the like, to ensure that the display screen displays the correct contents, a camera may be used to acquire a corner image of the display screen (such as a specific QR code preset at that position of the image), by distinguishing whether the image at that position is correct (such as whether the image is the specific QR code), it could be determined whether the display screen still performs normal display (such as whether the display screen is turned off due to a fault, whether the display screen is blurred, etc.), and whether the specific display content is correct, or the like.

Apparently, it should be understood that the specific application requiring acquisition of a local display image of the display screen is not limited to the above examples.

Referring to FIG. 1, in some existing art, when a display screen 19 is set, a camera (i.e., an image acquisition unit 11) may be disposed at a specific position far away from the display screen 19 in advance, aligned to the area desired to acquire on the display screen 19, and focused to capture the image. After the display image is obtained, the desired local/global image can be obtained through later image processing, such as image cutting and pasting.

However, this method requires the camera to be arranged according to the position of the display screen in advance and focused, involving complicated operations.

Moreover, if the display screen is rotated, displaced or the like due to some reasons after the camera is set, the camera will become incorrectly positioned or focused or the like, making it impossible to acquire the image accurately. In this case, the position of the camera needs to be adjusted again, which is troublesome. Further, in many cases, it is impossible to ensure that the camera can be adjusted in time each time the display screen is rotated or displaced (for example, for a huge number of display screens in many public places, it is obviously impossible to have a specially-assigned person to adjust the display screens at any time), and therefore, the camera may be not able to acquire the correct image for a long time.

In addition, due to the long distance between the camera and the display screen in the above method, people, objects and the like may enter the area between the camera and the display screen and block the shooting path of the camera, which may also cause the camera unable to acquire the desired image.

In a first aspect, referring to FIGS. 2 to 10, an embodiment of the present disclosure provides an image acquisition assembly.

The image acquisition assembly according to the embodiment of the present disclosure is disposed on a display screen 19, such that an image acquisition unit 11 therein is aligned to a designated local area on a display surface of the display screen 19, and acquires a display image in the local area.

The display screen 19 is a product that can implement an image display function and has a display surface for display. For example, the overall display screen 19 may be a plate-like structure, in which at least one of the two major opposite side surfaces is provided with a display surface.

In the embodiment of the present disclosure, the specific type of the display screen 19 suitable for the image acquisition assembly is not limited. For example, the display screen 19 may be a liquid crystal display panel (LCD), an organic light-emitting diode (OLED) display panel, a monitor, electronic paper, a mobile phone, a tablet, a television, a laptop, a digital album, a navigator, or any other product with a display function.

In some embodiments, the image acquisition assembly according to the embodiment of the present disclosure may be used in a display screen 19 in a public place.

That is, the image acquisition assembly according to the embodiments of the present disclosure is particularly suitable for display screens 19 in public places, such as those on subways, on buses, advertisement display screens, and the like.

The image acquisition assembly according to the embodiment of the present disclosure includes: an attachment unit configured to be attached onto a display surface of a display screen 19; and an image acquisition unit 11 connected to the attachment unit and configured to acquire an image on the display surface at a position where the attachment unit is located.

Here, the attachment unit refers to a structure that can be "attached (e.g., adsorbed)" to the display surface of the display screen 19 by any means.

In some embodiments, the image acquisition assembly according to the embodiment of the present disclosure is used in a display screen 19 with a smooth display surface, and further used in a display screen 19 with a flat display surface.

Apparently, "attachment" is generally easier to achieve on a smooth surface, especially a flat surface. Therefore, the image acquisition assembly according to the embodiments of the present disclosure is particularly suitable for a display screen 19 with a smooth display surface (and further with a flat display surface).

Apparently, it is also feasible if the display screen 19 has a curved display surface. Alternatively, the display surface can be bent and deformed into various shapes.

The image acquisition unit 11 refers to any device that can implement an image acquisition function, such as a camera for capturing continuous images, or a camera for capturing separate images at intervals.

In an embodiment of the present disclosure, the image acquisition unit 11 is connected to the attachment unit, so that when the attachment unit is attached to the display surface of the display screen 19, the image acquisition unit 11 can capture a display image on the display surface at the position where the attachment unit is located.

The image acquisition assembly according to the embodiment of the present disclosure includes an attachment unit and an image acquisition unit 11 mutually connected, and the attachment unit may be attached to the display surface of the display screen 19 at any desired position, so that the image acquisition unit 11 can acquire the display image on the display surface at the position (i.e., any desired position) where the attachment unit is located.

It can be seen that attaching the attachment unit to the display surface of the display screen 19 at a position where the image is desired to be acquired is equivalent to positioning the image acquisition unit 11 (such as a camera) at the desired position, so that the image acquisition unit 11 can directly acquire the image without separately providing the image acquisition unit 11 and focusing, which is simple in operation.

Meanwhile, when the display screen 19 is rotated, displaced or the like, the attachment unit and the image acquisition unit 11 are naturally subjected to the same rotation, displacement or the like, while relative positions of the image acquisition unit 11 and the display screen 19 remain unchanged. Therefore, the image acquisition unit 11 can be still naturally aligned to the area of the display screen 19 where image acquisition is desired while ensuring accurate focusing. Therefore, manual adjustment of the image acquisition unit 11 is omitted, the operation is simple and convenient, and correct images can be acquired at any time.

In addition, since the image acquisition unit 11 is directly connected to the display screen 19 through the attachment unit, a very short distance is provided between the image acquisition unit 11 and the display screen 19. Therefore, people, objects and the like are not likely to enter between the image acquisition unit 11 and the display screen 19 to influence the shooting.

In some embodiments, the attachment unit includes: a housing 2 having a cavity 21 inside and an attachment port 211 in communication with the cavity 21, where when the housing 2 is placed on the display surface with the attachment port 211 facing the display surface, the display surface closes the attachment port 211 in a hermetic seal manner; and a moving structure 3 in the cavity 21, where the moving structure 3 is movable between a first position and a second position, and an outer side surface of the moving structure 3 maintains the hermetic seal with an inner side surface of the housing 2 during movement of the moving structure 3. The second position is a position in the cavity 21 farther away from the attachment port 211 than the first position.

Figure 4:
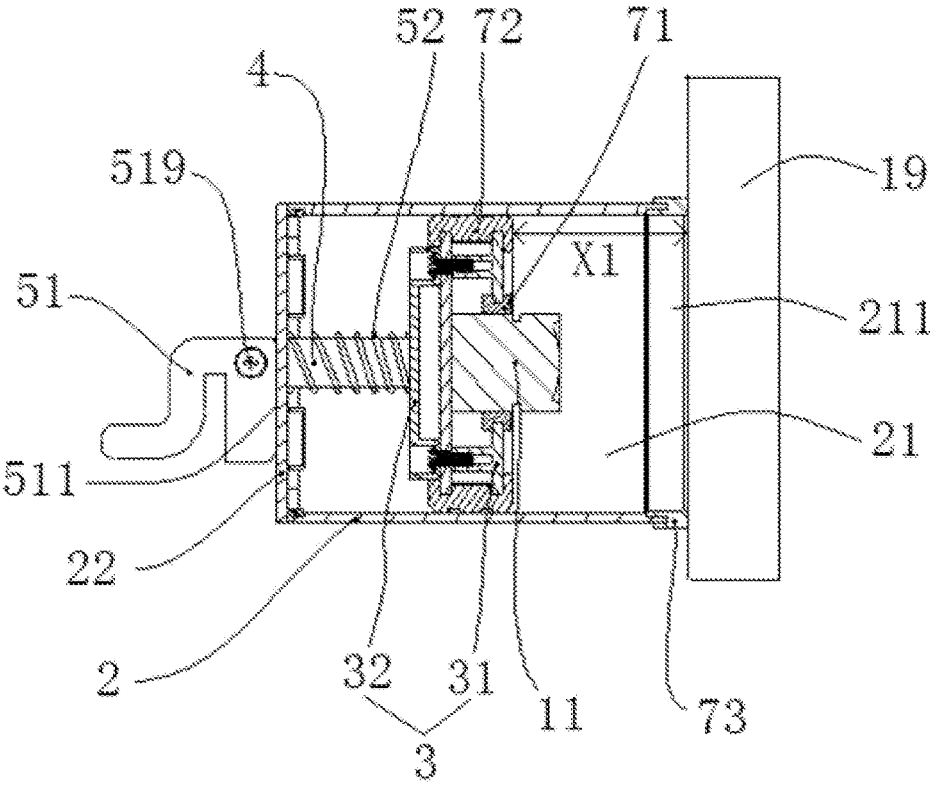
FIG. 4 is a sectional structural view of an image acquisition assembly according to an embodiment of the present disclosure disposed on a display screen in a released state.
Figure 5:
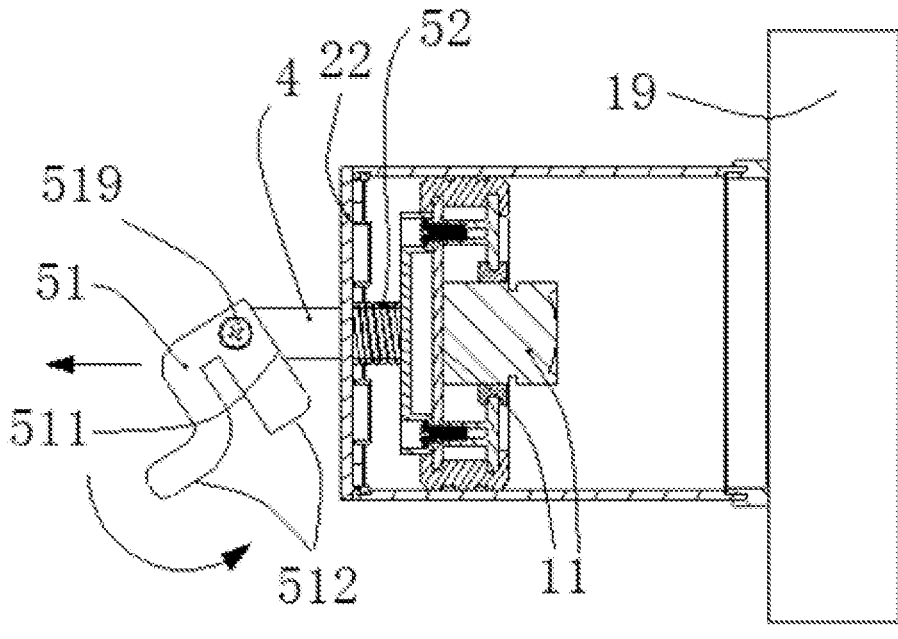
FIG. 5 is a sectional structural view of an image acquisition assembly according to an embodiment of the present disclosure disposed on a display screen converted from a released state to an attached state.
Figure 6:
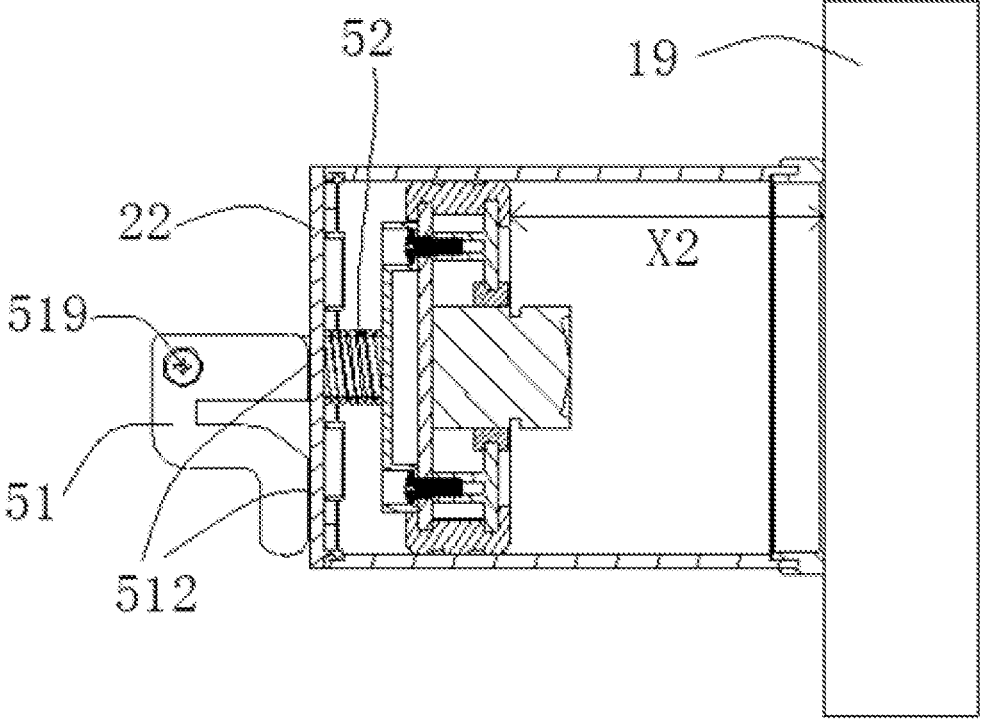
FIG. 6 is a sectional structural view of an image acquisition assembly according to an embodiment of the present disclosure disposed on a display screen in an attached state.

Referring to FIGS. 4 to 6, as a manner provided in an embodiment of the present disclosure, the above attachment unit may include a housing 2 having a cavity 21 inside (i.e., a hollow housing) and an "attachment port 211" in communication with the internal cavity 21. Moreover, an edge of the attachment port 211 of the housing 2 (or an "outer rim" of the attachment port 211) has a shape matched with the display surface of the corresponding display screen 19. For example, referring to FIGS. 4 to 6, if the display surface is a plane, then the edge of the attachment port 211 of the housing 2 is also located in one plane. Therefore, when the housing 2 is placed on the display surface with the attachment port 211 facing the display surface (i.e., the attachment port 211 is "abutted" against the display surface), any position on the edge of the attachment port 211 of the housing 2 is in contact with the display surface, and thereby, the attachment port 211 is "closed" by the display surface, forming a hermetic seal structure.

Meanwhile, the housing 2 is further provided with a moving structure 3 capable of reciprocating in a direction away from or close to the attachment port 211, such as a structure movable in a direction perpendicular to the display surface. Moreover, during the movement of the moving structure 3, an outer side surface of the moving structure 3 can maintain the hermetic seal with an inner side surface of the housing 2.

Figure 3:
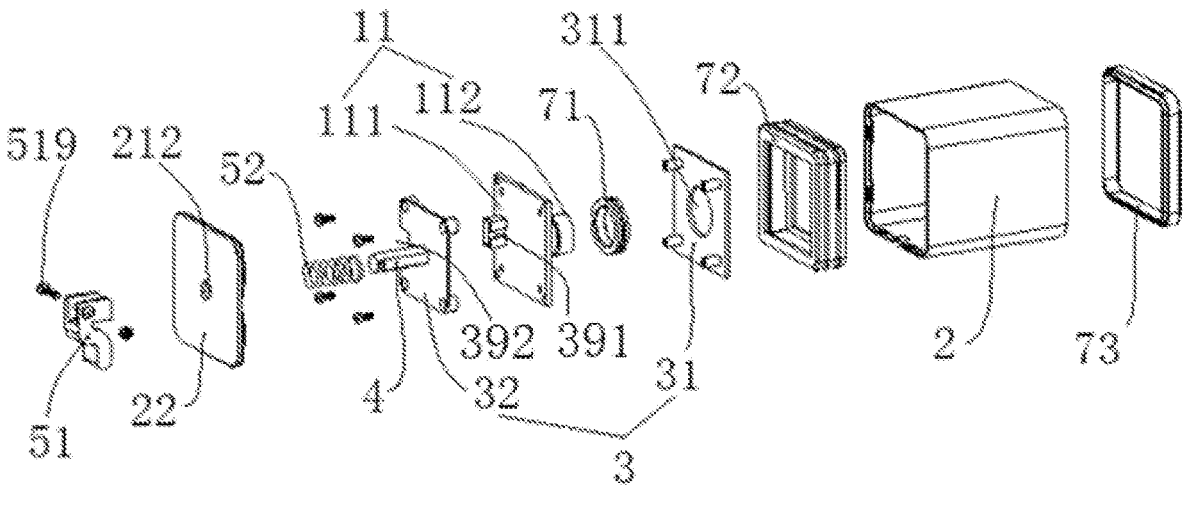
FIG. 3 is an exploded view of an image acquisition assembly according to an embodiment of the present disclosure in another orientation.

Therefore, referring to FIG. 3, when the moving structure 3 is in the first position (release position) closer to the attachment port 211 (at a distance X1 from the attachment port, as shown in FIG. 3), the attachment port 211 of the housing 2 is "abutted" against, and closed by, the display surface. Then, referring to FIG. 5, the moving structure 3 is moved to the second position (attachment position) farther away from the attachment port 211 (at a distance X2 from the attachment port, as shown in FIG. 5). Due to the hermetic seal between the housing 2 and the display surface, and between the housing 2 and the moving structure 3, no gas enters the enclosed space (a part of the cavity 21) defined by the display surface, the housing 2 and the moving structure 3 during the above movement. Therefore, the above space is gradually enlarged along with the movement of the moving structure 3, while an air pressure therein is gradually reduced, and finally, the housing 2 is "pressed" or "adsorbed" on the display surface due to a difference in air pressure between the space and the external environment, that is, the attachment unit is attached to the display surface.

It can be seen that, for the above attachment unit, the attachment process can be naturally completed by abutting the attachment port 211 of the housing 2 against the display surface, and moving the moving structure 3 from the first position to the second position, which is simple in operation.

Figure 2:
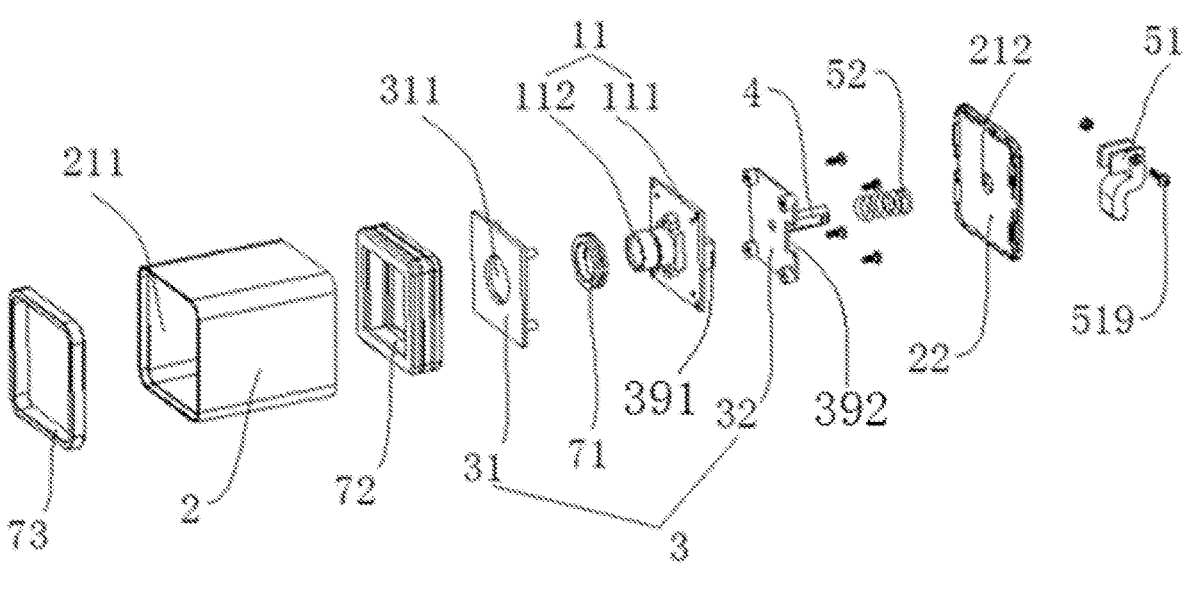
FIG. 2 is an exploded view of an image acquisition assembly according to an embodiment of the present disclosure.

Apparently, the specific shapes of the housing 2 and the moving structure 3 may vary. For example, the housing 2 may have a substantially "cylindrical" shape, as shown in FIGS. 2, 3, and the like, resulting that the cavity in the housing 2 also has a substantially "cylindrical (e.g., columnar, prismatic, etc.) shape. The moving structure 3 may slide back and forth in the "cylindrical" shape like a "piston".

In some embodiments, the image acquisition unit 11 is disposed in the cavity 21. The image acquisition unit 11 is configured to acquire the image of the display surface through the attachment port 211.

Referring to FIGS. 2 to 7, as a manner provided in an embodiment of the present disclosure, the image acquisition unit 11 may be positioned inside the cavity 21 of the housing 2, so that the image acquisition unit 11 can acquire the display image on the display surface only through the attachment port 211.

In this manner, on the one hand, the image acquisition assembly has a regular overall shape (i.e., the contour of the housing 2), thereby saving the space occupied by the image acquisition assembly. On the other hand, the image acquisition unit 11 can be positioned inside the housing 2 to play a certain protection role.

Apparently, it is also possible that the image acquisition unit 11 is connected to the housing 2 (the attachment unit) by other means. For example, the image acquisition unit 11 may be attached to a side surface of the housing 2 to be located outside the cavity 21.

In some embodiments, the image acquisition unit 11 is fixedly connected to the moving structure 3.

Referring to FIGS. 2 to 6, as a manner provided in an embodiment of the present disclosure, when the image acquisition unit 11 is located in the housing 2, the image acquisition unit 11 may be positioned on the moving structure 3, so that the image acquisition unit 11 is moved along with the moving structure 3.

For example, as a manner provided in an embodiment of the present disclosure, a focal length of the image acquisition unit 11 may be preset to ensure that when the moving structure 3 is in the second position (the attachment position), a focal point of the image acquisition unit 11 is located right at the attachment port 211, that is, directly on the display surface. Therefore, focusing of the image acquisition unit 11 is automatically completed as long as the attachment operation is completed, which can further simplify the operation.

In some embodiments, the image acquisition unit 11 includes a drive circuit board 111 and a lens 112 projecting from one side of the drive circuit board 111.

The moving structure 3 includes a first moving member 31 and a second moving member 32 mutually connected. The first moving member 31 has an opening 311 and is located on a side of the second moving member 32 close to the attachment port 211.

The drive circuit board 111 is sandwiched between the first moving member 31 and the second moving member 32, and the lens 112 passes through the opening 311 in the first moving member 31.

Referring to FIGS. 2 and 3, as a manner provided in an embodiment of the present disclosure, the image acquisition unit 11 may specifically include a lens 112 including glasses or the like, so as to form an optical path for acquiring an image. The lens 112 is disposed on the plate-like drive circuit board 111, and various circuits and electronic devices for driving the lens 112 to operate are disposed on the drive circuit board 111, so as to implement image acquisition and support the lens 112 at the same time.

Figure 8:
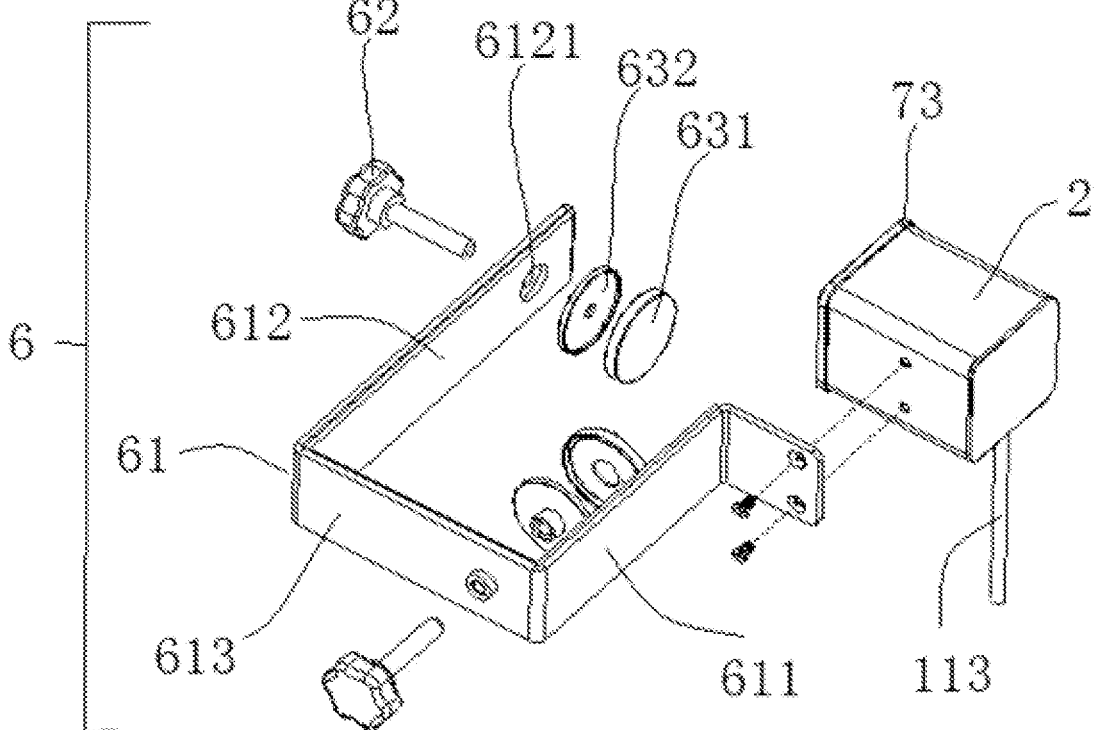
FIG. 8 is an exploded structural view of an engagement unit in another image acquisition assembly according to an embodiment of the present disclosure.
Figure 10:
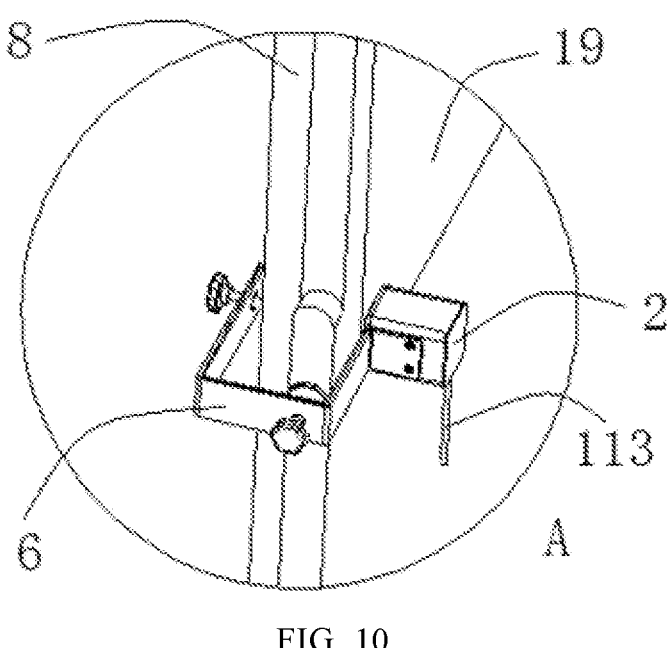
FIG. 10 is a partially enlarged view of position A in FIG. 9.

Apparently, referring to FIGS. 8 and 10, the image acquisition unit 11 (e.g., specifically the drive circuit board 111) may be further connected to a lead 113 or the like, so as to supply power to the image acquisition unit 11 and output image signals acquired by the image acquisition unit 11.

Accordingly, referring to FIGS. 2 and 3, the moving structure 3 includes two moving members, a first moving member 31 and a second moving member 32. The two moving members may be both plate-like and mutually connected, so that the drive circuit board 111 of the image acquisition unit 11 can be "fixedly sandwiched" between two moving members. Meanwhile, an opening 311 is further provided in the first moving member 31 closer to the attachment port 211 in the moving structure 3, for the lens 112 of the image acquisition unit 11 to pass through to acquire an image of the display surface.

Referring to FIGS. 2 and 3, the two moving members may be connected together by a plurality of screws (four screws are shown in the figure) passing through the first moving member 31 and the second moving member 32 (actually also the drive circuit board 111).

Apparently, the specific connection mode of the first moving member 31 and the second moving member 32 may vary. For example, the first moving member 31 and the second moving member 32 may be connected by snap-fit, bonding, or the like, as long as the two are connected and the circuit board of the image acquisition unit 11 is fixed between the two, which is not described in detail here.

In some embodiments, every two of the first moving member 31, the second moving member 32, and the drive circuit board 111 may be provided with an alignment protrusion 391 and an alignment notch 392 matched with each other.

For example, referring to FIGS. 2 and 3, as a manner referring to the figures, the drive circuit board 111 may be provided with an alignment protrusion 391 protruding toward the second moving member 32, while the second moving member 32 is provided with an alignment notch 392 into which the alignment protrusion 391 can be engaged. Therefore, when the moving structure 3 is assembled with the image acquisition unit 11, correct assembly can be ensured simply by aligning and engaging the alignment protrusion 391 and the alignment notch 392 with each other, while the stability of the structure is also improved.

Apparently, although FIGS. 2 and 3 take the drive circuit board 111 having the alignment protrusion 391 and the second moving member 32 having the alignment notch 392 as an example for illustration, it is also feasible to change the specific devices where the alignment protrusion 391 and the alignment notch 392 are located, which is not described in detail herein.

In some embodiments, a first sealing member 71 is provided between an outer side surface 31 of the lens 112 and an inner side surface of the opening 311 in the first moving member.

Referring to FIGS. 2 and 3, when the lens 112 of the image acquisition unit 11 is to pass through the opening 311 in the first moving member 31, a first sealing member 71 (e.g., a sealing ring, etc.) may be further provided between the two parts to prevent air leakage at a contact position of the two from influencing the attachment (e.g., adsorption) effect.

Apparently, it should be understood that the specific forms of the image acquisition unit 11 and the moving structure 3, and the connection manner between the image acquisition unit 11 and the moving structure 3, may both vary, and are not limited to the above examples. For example, the moving structure 3 may be a plate-like moving member in hermetic seal with the inner side surface of the housing 2, while the image acquisition unit 11 is directly connected (e.g., bonded, engaged, etc.) to a side of the moving member close to the attachment port 211.

In some embodiments, the image acquisition unit 11 is fixedly disposed on a side of the second position away from the attachment port 211, The moving structure 3 is made of a transparent material.

Figure 7:
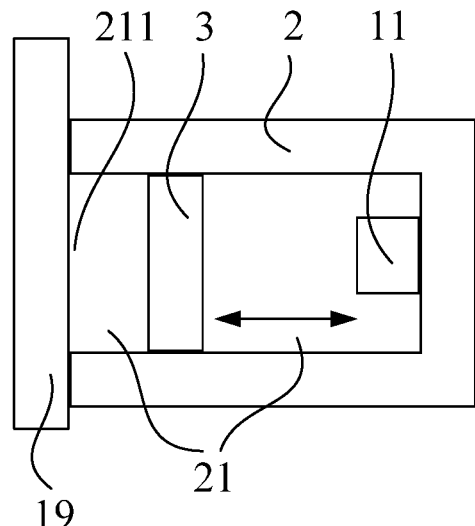
FIG. 7 is a simplified structural diagram of another image acquisition assembly according to an embodiment of the present disclosure.

Referring to FIG. 7, as another manner provided in an embodiment of the present disclosure, the image acquisition unit 11 may be fixedly disposed in the cavity 21 of the housing 2, and located at a position (e.g., directly fixed to a bottom inner side of the housing 2) farther away from the attachment port 211 than the second position (i.e., than the moving structure 3), while the moving structure 3 is transparent. Therefore, the image acquisition unit 11 can "pass through" the transparent moving structure 3 to acquire an image of the display surface. Therefore, the relative positions of the image acquisition unit 11 and the attachment port 211 are more fixed, which is further beneficial for accurate focusing.

Apparently, it should be understood that it is also feasible to dispose the image acquisition unit 11 at other positions. For example, the image acquisition unit 11 may be disposed at a position closer to the attachment port 211 than the first position (i.e., than the moving structure 3). For example, the image acquisition unit 11 may be disposed directly on the inner side surface of the housing 2.

Apparently, it should be understood that the image acquisition unit 11 may be connected by various manners, such as by snap-fit, bonding, or the like, which is not described in detail herein.

In some embodiments, the housing 2 is made of an opaque material.

As a manner provided in an embodiment of the present disclosure, the housing 2 may be made of an opaque material. For example, the housing 2 may be made of plastic, metal, or the like. In this manner, when the housing 2 is attached to the display surface, a position of the housing (i.e., the position where image acquisition is desired) may be "blocked", so as to prevent the image displayed at that position of the display surface from being seen from the outside, which on one hand ensures confidentiality, and on the other hand prevents the image at that position from interfering with the display effect. For example, a specific identification mark (such as the QR code mentioned above), rather than conventional display content, may be displayed at that position.

In some embodiments, a second sealing member 72 is disposed on an edge of the housing 2 corresponding to the attachment port 211.

Referring to FIGS. 2 and 3, the housing 2 is typically made of a rigid material, while the display surface of the display screen 19 is generally rigid, too. To effectively close the attachment port 211 with the display surface, a second sealing member 72 (such as a silicone gasket) may be disposed on an outer edge of the housing 2 corresponding to the attachment port 211. In other words, the second sealing member 72 may be "sleeved" on the attachment port 21 in a circle.

In some embodiments, a third sealing member 73 is disposed between the outer side surface of the moving structure 3 and the inner side surface of the housing 2.

To ensure good hermetic seal with the housing 2 during movement of the moving structure 3, a third sealing member 73 (e.g., a sealing ring) may be further provided between the outer side surface of the moving structure 3 and the inner side surface of the housing 2. For example, the third sealing member 73 may be sleeved on a side surface of the moving structure 3.

Apparently, the specific form of the third sealing member 73 should be matched with the form of the moving structure 3. For example, referring to FIGS. 2 and 3, when the moving structure 3 includes the first moving member 31 and the second moving member 32, and the drive circuit board 111 is sandwiched between the two moving members, the third sealing member 73 is equivalent to being sleeved outside the side surface of the drive circuit board 111. For example, the third sealing member 73 may be provided with two grooves into which edge portions of the first moving member 31 and the drive circuit board 111 are inserted respectively, thereby improving the sealing effect.

In some embodiments, the image acquisition assembly further includes: a locking structure configured to at least lock the moving structure 3 when the moving structure 3 is in the second position.

When the attachment unit is in the attached state (with the moving structure 3 in the second position), a side of the moving structure 3 corresponding to the external environment has a greater air pressure, so the moving structure is pushed by a force toward the first position. To ensure that the moving structure 3 can be automatically stabilized in the second position and maintain the attached state, a locking structure may be provided to fix the moving structure 3 in the second position.

The specific form of the locking structure may vary, and will be described in detail later.

In some embodiments, the housing 2 further has an operation port 212 in communication with the cavity 21. The operation port 212 and the attachment port 211 are positioned at two opposite ends of the cavity 21. The attachment unit further includes an operation structure 4. The operation structure 4 is connected to a side of the moving structure 3 facing away from the attachment port 211, and the operation structure 4 extends out of the housing 2 from the operation port 212.

Referring to FIGS. 2 to 6, an operation structure 4 may be further connected to a side of the moving structure 3 facing away from the attachment port 211 (specifically, the side of the second moving member 32 away from the attachment port 211 in FIGS. 2 to 6). The operation structure 4 may be in the form of an operating rod or the like as shown in FIGS. 2 to 6, and "extend out" of the housing 2 through an operation port 212 at an opposite end of the housing 2 to the attachment port 211. Therefore, a user can grasp the operation structure 4 to "drive" the moving structure 3 to move, thereby switching between the attached state and the released state of the attachment unit and facilitating operation.

Meanwhile, due to the operation port 212, a portion of the cavity 21 on the side of the moving structure 3 away from the attachment port 211 is in communication with the external environment, so that the air therein will not be compressed or expanded due to the movement of the moving structure 3, and no pressure change will be generated.

Apparently, the manner for implementing operation of the moving structure 3 is not limited thereto. For example, referring to FIG. 7, instead of the operation structure and the operation port in the attachment unit, the moving structure 3 may be driven to move by means of attraction with a magnetic device disposed outside the housing 2 (correspondingly, the moving structure 3 also includes a magnetic device), or under driving of a driving device disposed inside the housing 2, which is not described in detail herein.

In some embodiments, a locking structure is connected to the operation structure 4 at a position outside the housing 2. The locking structure is configured to at least contact the housing 2 to lock the moving structure 3 when the moving structure 3 is in the second position.

As a manner provided in an embodiment of the present disclosure, the locking structure may be connected to the operation structure 4 (e.g., operating rod) at a position outside the housing 2, so that the locking structure can be "engaged" to the housing 2 when the moving structure 3 is in the second position, thereby playing a role of positioning the moving structure 3.

In some embodiments, the housing 2 includes a rear wall 22 opposite to the attachment port 211. The operation port 212 is provided on the rear wall 22. The locking structure includes a locking member 51 and an elastic member 52. The elastic member 52 is disposed between a rear wall 22 and the moving structure 3. When the moving structure 3 is in the second position, the elastic member 52 applies a pressure toward the attachment port 211 to the moving structure 3. The locking member 51 is configured to at least contact one side of the rear wall 22 facing away from the attachment port 211 to lock the moving structure 3 when the moving structure 3 is in the second position.

Referring to FIGS. 2 to 6, as a manner provided in an embodiment of the present disclosure, the housing 2 may have a rear wall 22 (which may be the detachable rear wall 22 shown in FIGS. 2 and 3, or the rear wall 22 integrated with other positions of the housing 2). The operation port 212 is provided on the rear wall 22. Moreover, an elastic member 52 is provided between the rear wall 22 and the moving structure 3 (e.g., between the rear wall 22 and the second moving member 32). When the moving structure 3 is in the second position, the elastic member 52 is in a compressed state to apply a force toward the attachment port 211 to the moving structure 3. At this time, the locking member 51 of the locking structure is pulled by the operation structure 4 and caught on the rear wall 22, so that the moving structure 3 is prevented from further moving toward the attachment port 211, and thus locked.

In some embodiments, the elastic member 52 is a spring sleeved outside the operation structure 4.

Referring to FIGS. 2 to 6, the elastic member 52 may be specifically a spring sleeved outside the operation structure 4 (such as an operating rod), so that the operation structure 4 can play a role in positioning the spring to a certain extent, thereby ensuring stable positioning of the spring.

In some embodiments, the locking member 51 is rotationally connected to the operation structure 4 through a rotation shaft 519.

The locking member 51 has a first contact surface 511 and a second contact surface 512. A distance between the second contact surface 512 and the rotation shaft 519 is greater than a distance between the first contact surface 511 and the rotation shaft 519. A difference of the distance between the second contact surface 512 and the rotation shaft 519 and the distance between the first contact surface 511 and the rotation shaft 519, is equal to a distance between the first position and the second position.

When the locking member 51 is rotated such that the first contact surface 511 contacts a side of the rear wall 22 facing away from the attachment port 211, the locking member 51 is configured to lock the moving structure 3 in the first position. When the locking member 51 is rotated such that the second contact surface 512 contacts a side of the rear wall 22 facing away from the attachment port 211, the locking member 51 is configured to fix the moving structure 3 in the second position.

As a manner provided in an embodiment of the present disclosure, the locking member 51 (e.g., a handle) may be connected to the operation structure 4 through the rotation shaft 519 (e.g., as shown in FIGS. 2 and 3, the rotation shaft 519 may be inserted into holes in the locking member 31 and the operation structure 4, and fixed by a nut), so that the locking member 51 is rotatable relative to the operation structure 4 (e.g., operating rod). When rotated to a different position, the locking member 51 contacts the rear wall 22 with two different contact surfaces (a first contact surface 511 and a second contact surface 512) at different distances from the rotation shaft 519 (i.e., the connection between the locking member 51 and the operation structure 4).

Therefore, referring to FIG. 3, the attachment port 211 of the housing 2 may be "abutted" against the display surface of the display screen 19. At this time, the locking member 51 is rotated until the first contact surface 511 contacts the rear wall 22. Due to the short distance between the first contact surface 511 and the rotation shaft 519, the rotation shaft 519 is close to the rear wall 22. That is, the operation structure 4 has a shorter portion outside the housing 2 and a longer portion inside the housing 2, so that the moving structure 3 is locked in the first position close to the attachment port 211 and away from the rear wall 22, while the attachment unit is in the released state.

To perform attachment, referring to FIG. 4, the operation structure 4 is pulled by the locking member 51 to move in a direction facing away from the display screen 19, so that the moving structure 3 is driven to be away from the attachment port 211, thereby reducing the gas in the space defined by the display surface, the inner side surface of the housing 2, and the moving structure 3, and thereby implementing the attachment. Meanwhile, the locking member 51 is rotated such that the second contact surface 512 of the locking member 51 faces the rear wall 22.

Then, referring to FIG. 5, the locking member 51 is released, and the second contact surface 512 of the locking member 51 comes into contact with the rear wall 22 under the action of the elastic member 52 and an air pressure difference. Due to the long distance between the second contact surface 512 and the rotation shaft 519, that is, the long distance between the rotation shaft 519 and the rear wall 22, the operation structure 4 has a longer portion outside the housing 2 and a shorter portion inside the housing 2, so that the moving structure 3 is locked in the second position away from the attachment port 211 and close to the rear wall, while the attachment unit enters the attached state to be attached to the display surface kept stable, and then, the image acquisition unit 11 may start acquiring an image.

To remove the attachment unit from the display surface, the locking member 51 may be pulled again and rotated until the first contact surface 511 of the locking member 51 faces the rear wall 22. When the locking member 51 is released, the first contact surface 511 naturally contacts the rear wall 22, the moving structure 3 returns to the first position, the pressure difference between an interior of the attachment unit and the external environment disappears, and the attachment unit returns to the released state and can be moved from the first contact surface 511 toward the rear wall 22.

As can be seen, according to the above method, switching of the housing 2 between the attached state and the released state can be implemented simply by pulling and simply rotating the locking member 51, while the attachment unit remains stable in either the attached state or the released state by itself, resulting in simple operation.

Apparently, the specific form of the locking structure is not limited thereto, and may be any other structure that can lock the moving structure 3 in the second position.

In some embodiments, the attachment unit includes: a suction disk attached to the display surface.

As another manner provided in an embodiment of the present disclosure, the attachment unit may be a suction disk that can be directly attached to the display surface, while the image acquisition unit 11 may be connected to the suction disk (for example, to a link rod behind the suction disk).

Apparently, the specific form of the attachment unit is not limited to the above housing 2 and suction disk, and may be any other structure that can be attached to the display surface.

In some embodiments, the image acquisition assembly further includes: an engagement unit 6 configured to be engaged with a display screen 19. The attachment unit is connected to the engagement unit 6.

Figure 9:
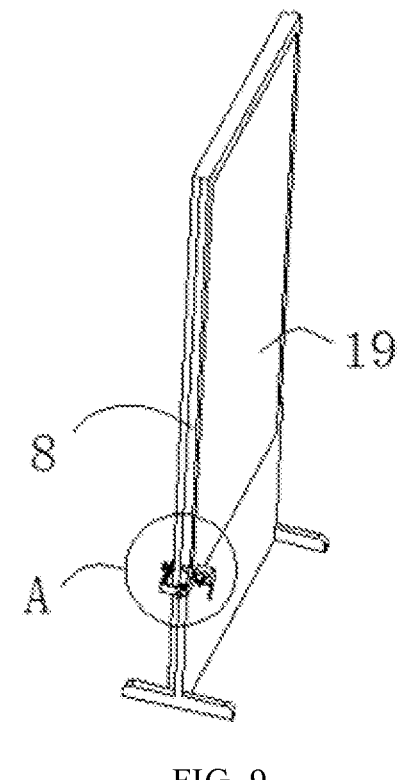
FIG. 9 is a schematic structural view of another image acquisition assembly according to an embodiment of the present disclosure in combination with a display screen.

Referring to FIGS. 8 to 10, as a manner provided in an embodiment of the present disclosure, the image acquisition assembly may further include an engagement unit 6 that can be engaged with the display screen 19, while the attachment unit (visible in the figures as the housing 2) is also connected to the engagement unit 6 (e.g., by two screws, as shown in FIG. 8). Therefore, when the engagement unit 6 is connected to the display screen 19, it is equivalent to fixing the attachment unit at a specific position on the display surface of the display screen 9, and at the same time, the attachment unit itself is also attached at the specific position, so that the positioning of the attachment unit (including the connected image acquisition unit 11) is more stable.

In some embodiments, the engagement unit 6 includes a clamp 61. The clamp 61 includes a first branch 611 and a second branch 612 spaced apart from each other, and a connection part 613 connecting the first branch 611 and the second branch 612. The first branch 611 and the second branch 612 are configured to clamp the display screen 19 therebetween, and the first branch 611 is located on a display surface side of the display screen 19. The attachment unit is connected to the first branch 611.

Referring to FIG. 8, the engagement unit 6 may specifically include two branches (a first branch 611 and a second branch 612) respectively located on two sides of the display screen 19. The two branches are connected by a connection part 613, while the attachment unit is connected to one of the branches (the first branch 611) on the display surface side. In other words, the overall engagement unit 6 is like a "clip" clipped onto the display screen 19, while the attachment unit is connected to one branch of the clip.

In some embodiments, the engagement unit 6 further includes a compression screw 62 and a gasket 631. The second branch 612 is provided with a screw hole 6121 matched with the compression screw 62. The compression screw 62 passes through the screw hole 6121, and is connected to the gasket 631 at an end close to the first branch 611.

Referring to FIG. 8, the engagement unit 6 may further include a compression screw 62. A screw hole 6121 matched with the compression screw 62 is provided on a branch (the second branch 612) corresponding to a back side (a side facing away from the display surface) of the display screen 19. The compression screw 62 is inserted into the screw hole 6121, and can be screwed to different degrees depending on the thickness of the display screen 19, so as to tightly clamp the display screen 19 between the compression screw 62 and the first branch 611 (i.e., the attachment unit). To avoid an excessive local pressure applied by the compression screw 62 on the display screen 19, a gasket 631 (such as a silicone gasket) may be connected to an end of the compression screw 62 in contact with the display screen 19.

Apparently, referring to FIG. 8, the engagement unit 6 may further include other structures, such as a clamping member 632 for receiving the gasket 631 or the like.

In some embodiments, the image acquisition assembly further includes: a bracket unit 8 on which the display screen 19 is disposed. The engagement unit 6 is connected to the bracket unit 8.

Referring to FIGS. 9 and 10, as a manner provided in an embodiment of the present disclosure, the image acquisition assembly may further include a bracket unit 8, and the display screen 19 is directly disposed on the bracket unit 8.

For example, the display screen 19 may be an advertisement display screen secured to and supported by the bracket unit 8, so that the bracket unit 8 and the display screen 19 together form a "billboard".

As can be seen, the display screen 19 has a fixed position relative to the bracket unit 8. Meanwhile, the engagement unit 6 is also connected to the bracket unit 8, so that the engagement unit 6 also has a fixed position relative to the bracket unit 8. Therefore, it can be more effectively ensured that the engagement unit 6 fixes the attachment unit at a specific position on the display screen 19.

The specific connection between the display screen 19 and the bracket unit 8, and the specific connection between the engagement unit 6 and the bracket unit 8, may vary. For example, referring to FIG. 9, the bracket unit 8 is an "outer frame" surrounding each side surface of the display screen 19, and the engagement unit 6 includes an engaging member 61 in the above "clip" from with the connection part 613 connected to one side of the "outer frame". Further, referring to FIGS. 8 and 10, the engaging member 61 may be "abutted" against the display screen 19 from one side, to ensure more stable positioning of the engaging member 61 and the display screen 19. For example, the engaging member 61 may be connected to the bracket unit 8 and "abutted" against the display screen 19 by including the above compression screw, screw hole, gasket, clamp, or other structures (not marked with reference numerals).

Apparently, the specific forms of the bracket unit 8 and the engagement unit 6 are not limited thereto, and will not be described in detail here.

Figure 11:
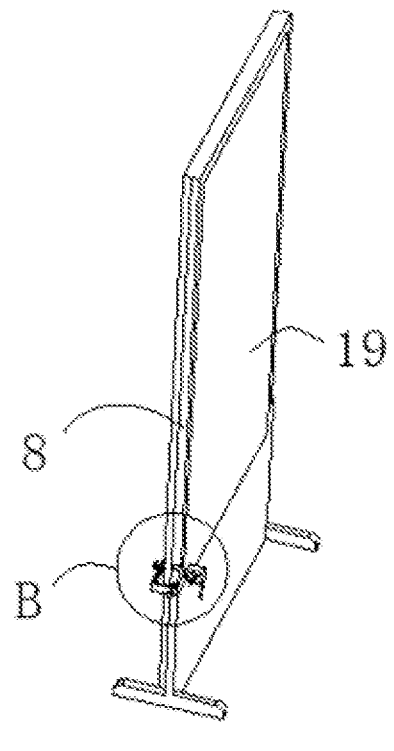
FIG. 11 is a schematic structural view of another image acquisition assembly according to an embodiment of the present disclosure in combination with a display screen.
Figure 12:
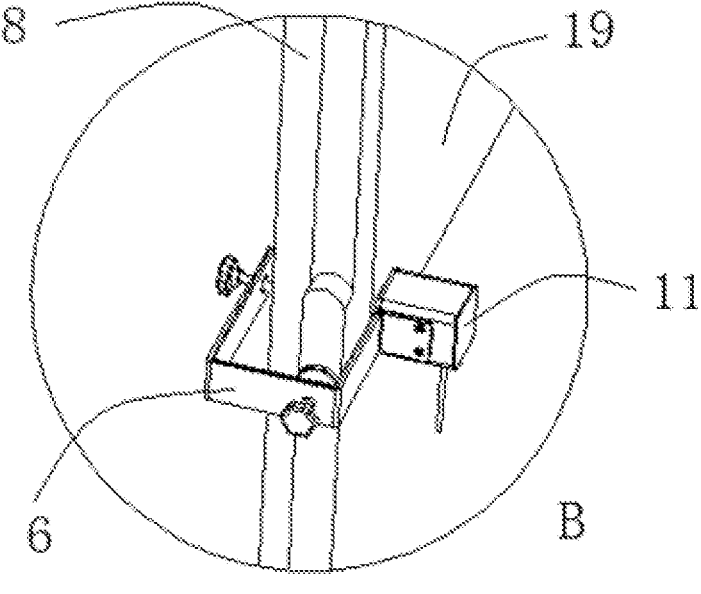
FIG. 12 is a partially enlarged view of position B in FIG. 11.

In a second aspect, referring to FIGS. 11 and 12, an embodiment of the present disclosure provides an image acquisition assembly.

The image acquisition assembly according to the embodiment of the present disclosure is disposed on a display screen 19, such that an image acquisition unit 11 therein is aligned to a designated local area on a display surface of the display screen 19, and the image acquisition unit 11 acquires a display image in the local area.

The image acquisition assembly according to the embodiments of the present disclosure is particularly suitable for display screens 19 in public places, such as those on subways, on buses, advertisement display screens, and the like.

The image acquisition assembly according to the embodiment of the present disclosure includes: an engagement unit 6 configured to be engaged with a display screen 19; and an image acquisition unit 11 connected to the engagement unit 6. When the engagement unit 6 is engaged with the display screen 19, the image acquisition unit 11 is located at a position away from a display surface of the display screen 19 by a preset distance, and the image acquisition unit 11 is configured to acquire an image of the display surface at a position where the image acquisition unit is located.

In the embodiment of the present disclosure, the engagement unit 6 has a fixed position relative to the image acquisition unit 11. Therefore, when the engagement unit 6 is fixed on the display screen 19, it is equivalent to that the image acquisition unit 11 (such as a camera) is disposed at a specific position relative to the display screen 19, and the image acquisition unit 11 can directly acquire an image of a desired area on the display surface without separately providing the image acquisition unit 11 and focusing, which is simple in operation.

Meanwhile, when the display screen 19 is rotated, displaced or the like, the engagement unit 6 and the image acquisition unit 11 are naturally subjected to the same rotation, displacement or the like, while relative positions of the image acquisition unit 11 and the display screen 19 remain unchanged. Therefore, the image acquisition unit 11 can be still naturally aligned to the area of the display screen 19 where image acquisition is desired while ensuring accurate focusing. Therefore, manual adjustment of the image acquisition unit 11 is omitted, the operation is simple and convenient, and correct images can be acquired at any time.

In addition, since the image acquisition unit 11 is directly connected to the display screen 19 through the engagement unit 6, a very short distance is provided between the image acquisition unit 11 and the display screen 19. Therefore, people, objects and the like are not likely to enter between the image acquisition unit 11 and the display screen 19 to influence the shooting.

In some embodiments, the engagement unit 6 includes a clamp. The clamp includes a first branch and a second branch spaced apart from each other, and a connection part connecting the first branch and the second branch. The first branch and the second branch are configured to clamp the display screen 19 therebetween, and the first branch is located on a display surface side of the display screen 19. The image acquisition unit 11 is connected to the first branch.

As a manner provided in an embodiment of the present disclosure, the engagement unit 6 may further include a clamp in the form of a "clip" composed of a connection part and two branches, as shown in FIG. 8, and in this case, the image acquisition unit 11 (not the attachment unit) is directly connected to one branch of the clip corresponding to the display surface.

Apparently, the engagement unit 6 may further include the compression screw, the screw hole, the gasket and the clamp shown in FIG. 8, or other structures, which are not described in detail here.

In some embodiments, the image acquisition assembly further includes: a bracket unit 8 on which the display screen 19 is disposed. The engagement unit 6 is connected to the bracket unit 8.

Referring to FIG. 9, as a manner provided in an embodiment of the present disclosure, the image acquisition assembly according to the embodiment of the present disclosure may further include the bracket unit 8 on which the display screen 19 is disposed. For example, the bracket unit 8 and the display screen 19 together form a "billboard". The engagement unit 6 is also connected to the bracket unit 8 to ensure more stable connection between the engagement unit 6 and the display screen 19.

The specific forms of the engagement unit 6 and the bracket unit 8 may vary. For example, the bracket unit 8 may be in the form of the "outer frame" described above, while the engagement unit 6 may be connected to the bracket unit 8 by the compression screw shown in FIG. 8 or other structures, which will not be described in detail herein.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. An image acquisition assembly, comprising:
an attachment unit configured to be attached onto a display surface of a display screen; and
an image acquisition unit connected to the attachment unit, and the image acquisition unit is configured to face the display surface and acquire an image of the display surface at a position where the attachment unit is located.

2. The image acquisition assembly according to claim 1, characterized in that the attachment unit comprises:
a housing having a cavity inside and an attachment port in communication with the cavity, wherein when the housing is placed on the display surface with the attachment port facing the display surface, the display surface closes the attachment port in a hermetic seal manner; and
a moving structure in the cavity, wherein the moving structure is movable between a first position and a second position, and an outer side surface of the moving structure maintains the hermetic seal with an inner side of the housing during movement of the moving structure; and the second position is a position in the cavity farther away from the attachment port than the first position.

3. The image acquisition assembly according to claim 2, characterized in that
the image acquisition unit is disposed in the cavity and configured to acquire the image of the display surface through the attachment port.

4. The image acquisition assembly according to claim 3, characterized in that
the image acquisition unit is fixedly connected to the moving structure.

5. The image acquisition assembly according to claim 4, characterized in that
the image acquisition unit comprises a drive circuit board and a lens projecting from one side of the drive circuit board;
the moving structure comprises a first moving member and a second moving member mutually connected, wherein the first moving member has an opening, and the first moving member is located on a side of the second moving member close to the attachment port; and
the drive circuit board is sandwiched between the first moving member and the second moving member, and the lens passes through the opening in the first moving member.

6. The image acquisition assembly according to claim 5, characterized in that
a first sealing member is provided between an outer side surface of the lens and an inner side surface of the opening in the first moving member.

7. The image acquisition assembly according to claim 2, characterized in that
the image acquisition unit is fixedly disposed on a side of the second position away from the attachment port; and
the moving structure is made of a transparent material.

8. The image acquisition assembly according to claim 2, characterized in that
the housing is made of an opaque material,
the attachment unit comprises a suction disk attached to the display surface,
a second sealing member is disposed on an edge of the housing corresponding to the attachment port, and
a third sealing member is disposed between the outer side surface of the moving structure and the inner side surface of the housing.

9. The image acquisition assembly according to claim 2, further comprising:
a locking structure configured to at least lock the moving structure when the moving structure is in the second position.

10. The image acquisition assembly according to claim 2, characterized in that
the housing further has an operation port in communication with the cavity, and the operation port and the attachment port are positioned at two opposite ends of the cavity; and
the attachment unit further comprises an operation structure connected to a side of the moving structure facing away from the attachment port, and the operation structure extends out of the housing from the operation port.

11. The image acquisition assembly according to claim 10, characterized in that
a locking structure is connected to the operation structure at a position outside the housing, and the locking structure is configured to at least contact the housing to lock the moving structure when the moving structure is in the second position.

12. The image acquisition assembly according to claim 11, characterized in that the housing comprises a rear wall opposite to the attachment port, and the operation port is provided on the rear wall; and the locking structure comprises a locking member and an elastic member; wherein the elastic member is disposed between a rear wall and the moving structure, and when the moving structure is in the second position, the elastic member applies a pressure toward the attachment port to the moving structure; and the locking member is configured to at least contact one side of the rear wall facing away from the attachment port to lock the moving structure when the moving structure is in the second position.

13. The image acquisition assembly according to claim 12, characterized in that the elastic member is a spring sleeved outside the operation structure.

14. The image acquisition assembly according to claim 12, characterized in that the locking member is rotationally connected to the operation structure through a rotation shaft;

the locking member has a first contact surface and a second contact surface, a distance between the second contact surface and the rotation shaft is greater than a distance between the first contact surface and the rotation shaft; and a difference of the distance between the second contact surface and the rotation shaft and the distance between the first contact surface and the rotation shaft, is equal to a distance between the first position and the second position; and when the locking member is rotated such that the first contact surface contacts a side of the rear wall facing away from the attachment port, the locking member is configured to lock the moving structure in the first position; and when the locking member is rotated such that the second contact surface contacts the side of the rear wall facing away from the attachment port, the locking member is configured to lock the moving structure in the second position.

15. The image acquisition assembly according to claim 1, further comprising:

an engagement unit configured to be engaged with the display screen; wherein the attachment unit is connected to the engagement unit.

16. The image acquisition assembly according to claim 15, characterized in that the engagement unit comprises:

a clamp comprises a first branch and a second branch spaced apart from each other, and a connection part connecting the first branch and the second branch, wherein the first branch and the second branch are configured to clamp the display screen therebetween, and the first branch is located on a display surface side of the display screen; wherein the attachment unit is connected to the first branch.

17. The image acquisition assembly according to claim 16, characterized in that the engagement unit further comprises a compression screw and a gasket;

the second branch is provided with a screw hole matched with the compression screw; and the compression screw passes through the screw hole, and the compression screw is connected to the gasket at an end close to the first branch.

18. The image acquisition assembly according to claim 15, further comprising:

a bracket unit on which the display screen is disposed; wherein the engagement unit is connected to the bracket unit.

19. An image acquisition assembly, comprising:

an engagement unit configured to be engaged with a display screen; and an image acquisition unit connected to the engagement unit; wherein when the engagement unit is engaged with the display screen, the image acquisition unit is located at a position away from a display surface of the display screen by a preset distance, and the image acquisition unit is configured to face the display surface and acquire an image of the display surface at a position where the image acquisition unit is located.

20. The image acquisition assembly according to claim 19, characterized in that, the image acquisition assembly further comprising:

a bracket unit on which the display screen is disposed; wherein the engagement unit comprises:

a clamp comprises a first branch and a second branch spaced apart from each other, and a connection part connecting the first branch and the second branch, wherein the first branch and the second branch are configured to clamp the display screen therebetween, and the first branch is located on a display surface side of the display screen; wherein the image acquisition unit is connected to the first branch, and the engagement unit is connected to the bracket unit.

* * * * *